(No Model.)
W. W. SEELEY.
POWER BALING PRESS.
No. 399,568. Patented Mar. 12, 1889.
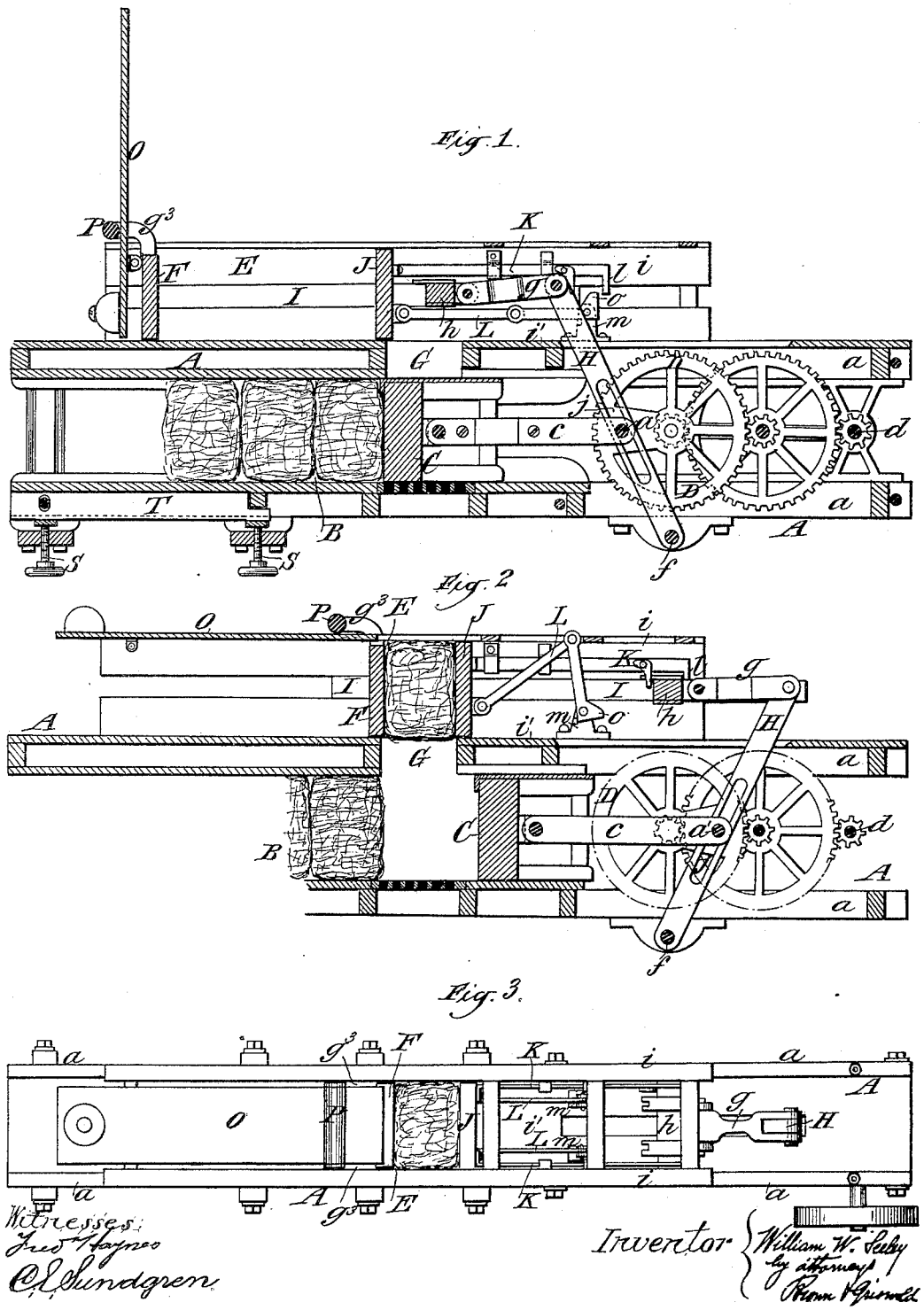

UNITED STATES PATENT OFFICE.

WILLIAM W. SEELEY, OF ALBANY, NEW YORK.

POWER BALING-PRESS.

SPECIFICATION forming part of Letters Patent No. 399,568, dated March 12, 1889.

Application filed August 30, 1888. Serial No. 284,162. (No model.)

*To all whom it may concern:*

Be it known that I, WILLIAM W. SEELEY, of Albany, in the county of Albany and State of New York, have invented a new and useful Improvement in Power-Presses, of which the following is a specification.

I have here illustrated my improvement as applied to a power-press for compressing hay into bales.

I will describe a machine embodying my improvement in detail, and then point out the novel features in claims.

In the accompanying drawings, Figure 1 is a longitudinal vertical section of a power-press embodying my improvement. Fig. 2 is likewise a longitudinal vertical section, but the parts are shown in a different position from that shown in Fig. 1. Fig. 3 is a plan or top view of the same, the press being shown in the same position as in Fig. 2.

Similar letters of reference designate corresponding parts in all the figures.

A designates the main frame of the machine. The frame, as shown, comprises longitudinally-extending portions $a$, which portions are secured together by bolt-rods or in any other suitable manner. Between the upper and lower of the longitudinally-extending portions $a$ of the frame is arranged a compression-chamber, B, where the bale of hay or other material receives its final compression. This chamber may be of the ordinary or any desired construction. Its greatest extension is in the direction of the length of the machine. With it the bales of hay or other material are moved along from the inner end to the outer end by means of a pusher or ram, C. This pusher or ram is operated by a pitman-rod, $c$, having a pivoted connection therewith and deriving motion from a crank-pin, $a'$, on a power-wheel, D. I have shown the power-wheel geared up to receive motion from a main shaft, $d$, which shaft may receive motion in any suitable manner.

In my machine the hay undergoes a preliminary condensing operation. After the preliminary condensation it passes to the compression-chamber B, where it is operated upon by the pusher or ram C. The preliminary condensing of the hay or other material occurs in a condensing-chamber, E. This chamber occupies a position upon the top of the main frame of the machine. The condensing of the material is done between a movable plunger or follower, F, and an abutment, which latter, when the condensing is taking place, occupies a fixed position, but which when the preliminary condensing has been accomplished is moved in such manner as to permit the material to pass downwardly through a feeding passage or chamber, G, and into the lower compression-chamber, B. It will be observed that in this press all the preliminary condensing is done rearwardly of the feeding chamber or passage G, and that therefore the feeding chamber or passage does not come into use until the preliminary condensing has been completed.

In the example of my improvement shown the plunger or follower derives motion from a lever, H, which lever is pivoted near one end upon a rod or bar, $f$, mounted upon the frame of the machine and pivotally connected near its other end to a link, $g$. The link $g$ is in turn pivotally connected to a cross-head, $h$. The cross-head is secured at its ends to slider bars or rods I, which slider bars or rods are guided in their longitudinal movements in guideways formed in the sides of the condensing-chamber and a frame, $i$, upon the top of the press.

The lever H derives motion from the power-wheel D and has a movable point of application of power, which in the example of my improvement shown is the crank-pin $a'$. The lever is provided with a longitudinal slot, $j$, through which the crank-pin $a'$ extends. The movements of the plunger or follower F and the pusher or ram C occur simultaneously in opposite directions, and a complete rotation of the power-wheel D is necessary in order to occasion a complete excursion of the follower and of the pusher or ram. The rotation of the power-wheel is so timed that the greatest leverage will be exerted by the power-wheel upon the lever H, when the plunger or follower F is being moved in a direction to condense the material in the condensing-chamber E, and therefore when the greatest leverage is required. The cross-head $h$ operates also to cause the movement of an abutment, J, which abutment during the time the material is being condensed in the condensing-chamber, as previously stated, operates to wholly close one end of the condensing-chamber, and during such operation is situated forward of the feeding passage or chamber G, as shown most clearly in Fig. 1.

In Fig. 2 I have shown the abutment J and the plunger or follower F as moved into their extreme rearward position, so that material condensed will be directly over the feeding passage or chamber G, from which it may be pushed downward into the compression-chamber in any suitable manner.

The forward movement of the abutment J does not commence until nearly the end of the movement of the plunger or follower. Rigidly secured to the forward side of the abutment J are slider-rods K, one upon each side. These slider-rods work in suitable guides upon the frame $i$. Near their forward ends they are provided with downwardly-extending portions or projections $l$, which extend into such position that when the cross-head $h$ is moved forwardly sufficiently far it will come into contact with said projections, and its continued forward movement will operate to move the abutment J forwardly. Pivotally connected to the front side of the abutment J is one of the ends of toggles L, which toggles are pivotally secured near their other ends to standards $m$, mounted upon a platform or top $i'$, secured to the main frame.

When the lever H is rocked to cause a rearward movement of the cross-head $h$, the latter comes in contact with the toggles and operates the toggles by moving along upon their upper sides to move the abutment J rearwardly and into the position shown in Fig. 1. When in such position, the cross-head operates to detain the toggles, and therefore prevents any movement of the abutment J until the operation of compression has been completed. The lever H, when rocked in the other direction, moves the cross-head off from over the toggles, and the forward movement of the abutment may be then readily accomplished.

I have shown upon the forward arms of the toggles upward-extending projections $o$, with which the cross-head comes into contact during its forward movement to assist in rocking the toggles.

O designates a cover for the condensing-chamber E, which cover has a pivotal connection near one of its ends with the sides of the condensing-chamber, so that it may rock or tilt. Secured to the sides of the follower F, as here shown, are uprights $g^3$. These uprights are curved near their upper ends to extend in a direction substantially parallel with the top of the frame and above the latter. They bear between them a roller, P, which roller will, when the follower is moved to and fro, roll along the top of the cover O. When the follower F is moved forwardly or during the act of compression, the roller operates to keep the cover always closed.

It will be observed that the roller occupies such a position relatively to the follower or plunger F that when the act of compression is taking place it exerts constant pressure upon the cover at the point over which the compression is being exerted, and therefore prevents upward bulging or springing of the cover.

I have shown a weight upon the cover beyond where it is pivoted, which weight operates to open the cover when the follower is in its most rearward position. The condensing-chamber is then in condition to receive a new charge of material.

Set-screws S may be operated to tilt a rocking platform, T, over which the bales of material pass from the compression-chamber in order to cause frictional resistance to be offered to the movement of the bales.

It will be seen by my improvement that the plunger or follower F of the condenser is operated independently of the pusher or ram C, and that I am enabled to obtain a range of movement of the plunger or follower which is not dependent upon the range of movement of the pusher or ram.

What I claim as my invention, and desire to secure by Letters Patent, is—

1. In a press, the combination, with a condensing-chamber, of a compression-chamber, a feeding passage or chamber intermediate the same, a plunger or follower operating in the condensing-chamber, a movable abutment for the condensing-chamber, a pusher or ram operating in the compression-chamber, driving mechanism, a connection between said driving mechanism and the movable abutment and between the driving mechanism and the follower, and a connection between the driving mechanism and the pusher or ram, said plunger or follower and abutment being moved forwardly in unison to convey compressed material above the feeding passage or chamber, through which it may be forced downwardly in front of the pusher or ram, substantially as specified.

2. In a press, the combination, with a condensing-chamber, of a plunger or follower within the condensing-chamber, a movable abutment operating to close one end of said chamber during the compression, toggles maintaining said abutment in such position, a cross-head for operating the toggles, a lever for operating the cross-head, a connection between the lever and the cross-head, and a connection between the cross-head and the plunger or follower, substantially as specified.

3. In a press, the combination, with a condensing-chamber, of a movable abutment closing one end of said chamber during the compression, a plunger within said chamber, slider-bars connected to said plunger or follower, toggles acting on said abutment, a cross-head operating both the follower or plunger and the abutment, and a lever for operating the cross-head, substantially as specified.

4. In a press, the combination, with a pusher or ram, of a crank for operating the pusher or ram, a plunger or follower, a movable abutment, a lever operated from said crank, and a connection between said lever and the plunger or follower and between the lever and the abutment, whereby motion is transmitted to both the plunger or follower and said abutment, substantially as specified.

5. In a press, the combination, with a pusher or ram, of a crank for operating said pusher or ram, a plunger or follower, a movable abutment, a slotted lever operating to transmit motion both to the follower or plunger and the abutment, and a connection between said lever and the plunger or follower and between the lever and the abutment, substantially as specified.

6. In a press, the combination, with a condensing-chamber, of a rocking or tilting cover therefor and a movable roller carried by the follower or plunger above said cover and occupying such a position as to be approximately above the point of compression, substantially as specified.

WILLIAM W. SEELEY.

Witnesses:
FREDK. HAYNES,
ARTHUR H. GAMBLIN.